(12) United States Patent
Pucher

(10) Patent No.: US 10,868,347 B2
(45) Date of Patent: Dec. 15, 2020

(54) BATTERY MODULE INCLUDING A COOLING PLATE WITH EMBEDDED COOLING TUBES

(71) Applicant: Samsung SDI Co., Ltd., Yongin-si (KR)

(72) Inventor: Matthias Pucher, Graz (AT)

(73) Assignee: Samsung SDI Co., LTD, Yongin-Si (KR)

( * ) Notice: Subject to any disclaimer, the term of this patent is extended or adjusted under 35 U.S.C. 154(b) by 16 days.

(21) Appl. No.: 15/276,404

(22) Filed: Sep. 26, 2016

(65) Prior Publication Data

US 2017/0110773 A1 Apr. 20, 2017

(30) Foreign Application Priority Data

Oct. 14, 2015 (EP) .................................... 15189704

(51) Int. Cl.
| | |
|---|---|
| *H01M 10/6555* | (2014.01) |
| *H01M 2/10* | (2006.01) |
| *H01M 10/625* | (2014.01) |
| *H01M 10/613* | (2014.01) |
| *H01M 10/6556* | (2014.01) |
| *H01M 10/653* | (2014.01) |
| *H01M 10/6552* | (2014.01) |

(52) U.S. Cl.
CPC ..... *H01M 10/6555* (2015.04); *H01M 2/1077* (2013.01); *H01M 10/613* (2015.04); *H01M 10/625* (2015.04); *H01M 10/653* (2015.04); *H01M 10/6552* (2015.04); *H01M 10/6556* (2015.04); *H01M 2220/20* (2013.01)

(58) Field of Classification Search
CPC ........... H01M 10/6555; H01M 2/1077; H01M 10/625; H01M 10/613; H01M 10/6552; H01M 10/653; H01M 2220/20; H01M 10/6556
USPC ......................................................... 429/120
See application file for complete search history.

(56) References Cited

U.S. PATENT DOCUMENTS

| | | | |
|---|---|---|---|
| 5,249,624 A | 10/1993 | Pow et al. | |
| 2011/0293974 A1* | 12/2011 | Yoon ................... | H01M 2/1083 429/72 |

(Continued)

FOREIGN PATENT DOCUMENTS

| | | |
|---|---|---|
| CN | 102623771 A | 8/2012 |
| CN | 204558624 U | 8/2015 |

(Continued)

OTHER PUBLICATIONS

European Search Report in corresponding European Application No. 15189704.8-1360, dated Dec. 16, 2015, 7 pages.

(Continued)

*Primary Examiner* — Jonathan G Jelsma
*Assistant Examiner* — Omar M Kekia
(74) *Attorney, Agent, or Firm* — Lewis Roca Rothgerber Christie LLP

(57) ABSTRACT

A battery module includes a plurality of secondary battery cells; one or more cooling tubes formed of a metal material; and a cooling plate formed of casted aluminum, the cooling plate being cast around the one or more cooling tubes, the one or more cooling tubes being molded within the cooling plate.

15 Claims, 4 Drawing Sheets

(56) References Cited

U.S. PATENT DOCUMENTS

| | | | |
|---|---|---|---|
| 2012/0125447 A1* | 5/2012 | Fuhr | H01M 2/0262 |
| | | | 137/260 |
| 2012/0231316 A1 | 9/2012 | Sohn | |
| 2012/0315529 A1 | 12/2012 | Jin | |
| 2013/0011713 A1* | 1/2013 | Harada | H01M 2/1077 |
| | | | 429/120 |
| 2013/0143093 A1 | 6/2013 | Teng et al. | |
| 2014/0322582 A1* | 10/2014 | Ruter | H01M 2/1072 |
| | | | 429/120 |
| 2016/0149276 A1 | 5/2016 | Elliot et al. | |

FOREIGN PATENT DOCUMENTS

| | | |
|---|---|---|
| DE | 10 2011 016738 A1 | 10/2012 |
| JP | 10-106521 | 4/1998 |
| JP | 2008-59950 A | 3/2008 |
| JP | 2008-282678 A | 11/2008 |
| JP | 2013-16351 A | 1/2013 |
| KR | 10-2012-0102344 | 9/2012 |
| WO | 2014/206947 A1 | 12/2014 |

OTHER PUBLICATIONS

EPO Office Action dated Jun. 2, 2017, for corresponding European Patent Application No. 15189704.8 (5 pages).
KIPO Office Action dated Jul. 12, 2017, for corresponding Korean Patent Application No. 10-2016-0123436 (6 pages).
Korean Notice of Allowance dated Mar. 7, 2018, for corresponding Korean Patent Application No. 10-2016-0123436 (5 pages).
EPO Office Action dated Jul. 18, 2018, for corresponding European Patent Application No. 15189704.8 (5 pages).
European Office Action, dated Feb. 5, 2019, for corresponding European Patent Application No. 15189704.8 (3 pages).
Chinese Office Action dated Sep. 3, 2020, for corresponding Chinese Patent Application No. 201610848248.2 (8 pages).

* cited by examiner

BATTERY MODULE INCLUDING A COOLING PLATE WITH EMBEDDED COOLING TUBES

CROSS-REFERENCE TO RELATED APPLICATIONS

This application claims priority to and the benefit of European Patent Application No. 15189704.8, filed on Oct. 14, 2015, in the European Patent Office, and entitled: "BATTERY MODULE INCLUDING A COOLING PLATE WITH EMBEDDED COOLING TUBES" the entire contents of which are incorporated herein by reference.

BACKGROUND

1. Field

The present invention relates to a battery module for secondary batteries including a cooling plate. Further, a manufacturing method for the cooling plate is provided. The invention also relates to a vehicle including the battery module.

2. Description of the Related Art

A rechargeable battery differs from a primary battery in that it can be repeatedly charged and discharged, while the primary battery makes only an irreversible conversion of chemical energy to electrical energy. Low-capacity rechargeable batteries are used as the power supply for small electronic devices, such as cellular phones, notebook computers and camcorders, while high-capacity rechargeable batteries are used as the power supply for driving motors in hybrid vehicles and the like.

In general, rechargeable batteries include an electrode assembly including a positive electrode, a negative electrode, and a separator interposed between the positive and negative electrodes, a case receiving the electrode assembly, and an electrode terminal electrically connected to the electrode assembly. The case may have a cylindrical or rectangular shape depending on the purpose and the usage of the rechargeable battery, and electrolyte solution is injected into the case for charging and discharging of the rechargeable battery through an electrochemical reaction of the positive electrode, the negative electrode, and the electrolyte solution.

Rechargeable batteries may be used as a battery module formed of a plurality of unit batteries coupled in series so as to be used to power a motor driving a hybrid vehicle that benefits from high energy density. For example, the battery module may be formed by connecting an electrode terminal of each of the plurality of unit batteries depending on the amount of power required for motor driving, such that a high-power rechargeable battery can be realized.

In order to improve the safety of the battery module, heat generated from the rechargeable battery may be efficiently emitted, discharged and/or dissipated. If the heat emission/discharge/dissipation is not sufficiently performed, a temperature deviation may occur between the respective unit batteries, such that the battery module cannot generate a desired amount of power for motor driving. In addition, when the internal temperature of the battery increases due to the heat generated from the rechargeable battery, an abnormal reaction occurs therein and thus charging and discharging performance of the rechargeable battery deteriorates and the life-span of the rechargeable battery is shortened. Thus, a cooling device that can cool the rechargeable battery by effectively emitting/discharging/dissipating heat generated from the battery can improve the safety, performance, and life-span of the rechargeable battery.

Therefore, a battery module may, for example, include a cooling plate made of casted aluminum, which is provided adjacent to a bottom surface of the battery cells so as to cool them down. One or more tubes, through which a coolant can flow, are integrated into the cooling plate, e.g., are in thermal contact with the cooling plate. The coolant performs a heat exchange with the battery cells while circulating inside the tubes. In a comparative manufacturing process, the tubes are attached to the cooling plate by fixing means such as clamps, brackets, etc. However, the manufacturing process of the cooling plate is expensive due to the number of parts which have to be properly connected.

SUMMARY

According to one aspect of embodiments of the present invention, a battery module includes: a plurality of secondary battery cells; one or more cooling tubes formed of a metal material; and a cooling plate formed of casted aluminum, the cooling plate being cast around the one or more cooling tubes, the one or more cooling tubes being molded within the cooling plate.

One or more cooling plates may be within a housing of the battery module. The battery cells may be arranged in two or more levels within said housing, each level including at least one cooling plate.

A plurality of cooling interfaces may connect the cooling tubes to supply lines or return lines, wherein the cooling interfaces may be at an outer surface of the housing.

Two or more of the (for example, prismatic or rectangular) secondary battery cells may be bundled in a row and at least two cooling tubes may be positioned underneath the row such that each battery cell is in thermal contact with the at least two cooling tubes.

The metal material of the one or more cooling tubes may be steel.

According to another embodiment of the present invention, a method of manufacturing a cooling plate for a battery module including a plurality of secondary battery cells includes: providing one or more preformed cooling tubes formed of a metal material in a casting die; and casting aluminum into the die in order to form a cooling plate.

Aspects of the present invention also include a cooling plate which is produced by the afore-mentioned manufacturing method, and a battery module respectively including the same.

Another aspect of the present invention refers to a vehicle including a battery module as described above or being manufactured according to the manufacturing method described herein.

Further aspects of the present invention are described in the dependent claims and/or the following description.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
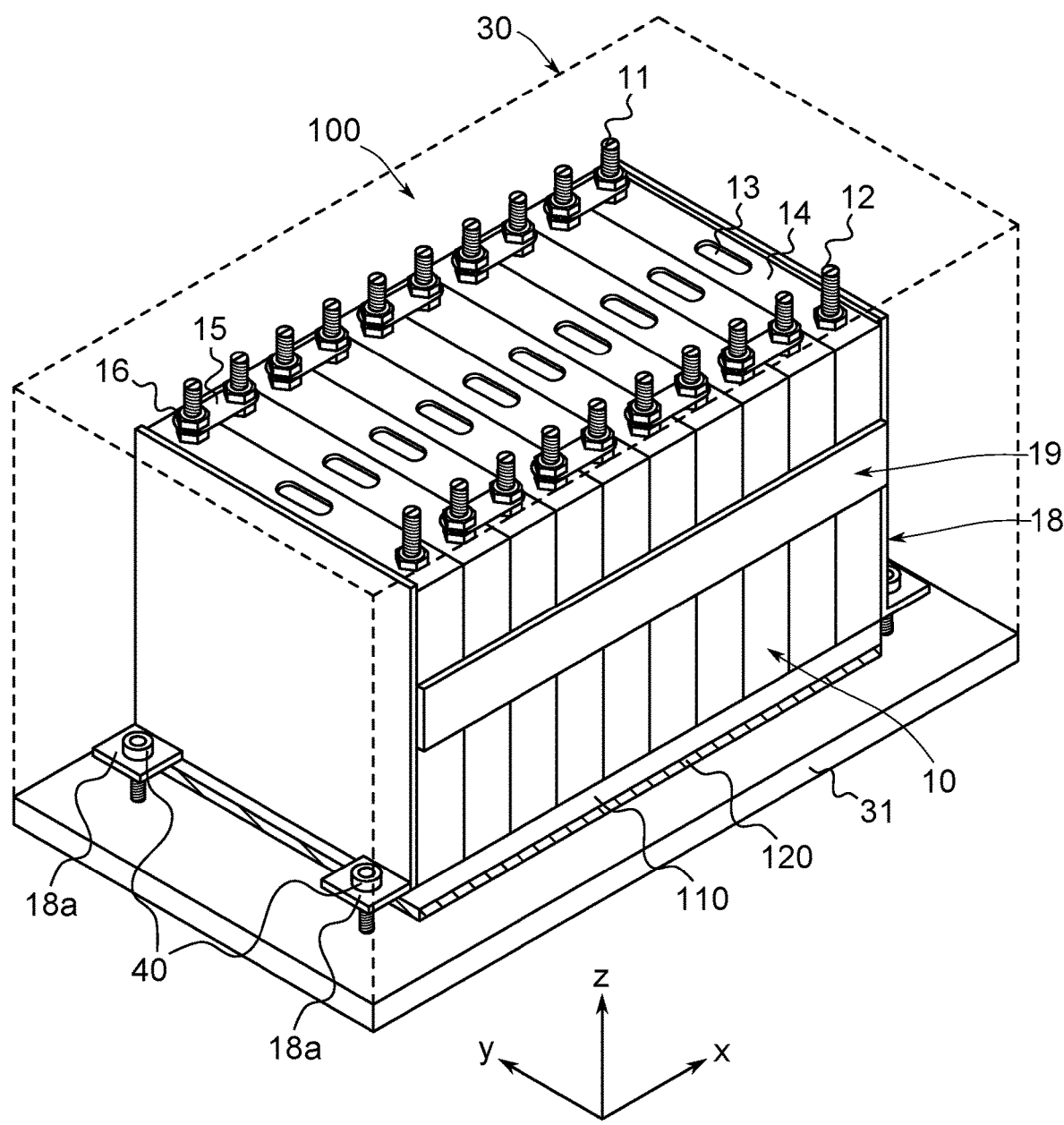
FIG. 1 illustrates a perspective view of a comparative battery module.

Referring to FIG. 1, an exemplary embodiment of a comparative battery module 100 includes a plurality of battery cells 10 aligned in one direction and a heat exchange member 110 provided adjacent to (e.g., contacting) a bottom surface of the plurality of battery cells 10. A pair of end plates 18 are provided to face wide surfaces of the battery cells 10 at the outside of the battery cells 10, and a connection plate 19 is configured to connect the pair of end plates 18 to each other, thereby fixing the plurality of battery cells 10 together. Fastening portions 18a on both sides of the battery module 100 are fastened to a support plate 31 by bolts 40. The support plate 31 is part of a housing 30.

Here, each battery cell 10 is a prismatic (or rectangular) cell, the wide flat surfaces of the cells being stacked together (e.g., contacting or facing one another) to form the battery module. Further, each battery cell 10 includes a battery case configured to accommodate an electrode assembly and an electrolyte. The battery case is hermetically sealed by a cap assembly 14. The cap assembly 14 is provided with positive and negative electrode terminals 11 and 12 having different polarities, and a vent 13. The vent 13 is a safety feature of the battery cell 10, which acts as a passage through which gas produced in the battery cell 10 can be exhausted to the outside of the battery cell 10. The positive and negative electrode terminals 11 and 12 of neighboring battery cells 10 are electrically connected through a bus bar 15, and the bus bar 15 may be fixed by a nut 16 or the like. Hence, the battery module 100 may be used as a power source unit by electrically connecting the plurality of battery cells 10 as one bundle.

Generally, the battery cells 10 generate a large amount of heat while being charged and/or discharged. The generated heat is accumulated in the battery cells 10, thereby accelerating the deterioration of the battery cells 10. Therefore, the battery module 100 further includes a heat exchange member 110, which is provided adjacent to (e.g., contacting) the bottom surface of the battery cells 10 so as to cool down the battery cells 10. In addition, an elastic member 120 made of rubber or other elastic materials may be interposed between the support plate 31 and the heat exchange member 110.

The heat exchange member 110 may include a cooling plate provided to have a size corresponding to that of the bottom surface of the plurality of battery cells 10, e.g. the cooling plate may completely overlap the entire bottom surfaces of all the battery cells 10 in the battery module 100. The cooling plate may include a passage through which a coolant can move (or flow). The coolant performs a heat exchange with the battery cells 10 while circulating inside the heat exchange member 110, e.g., inside the cooling plate.

Figure 2:
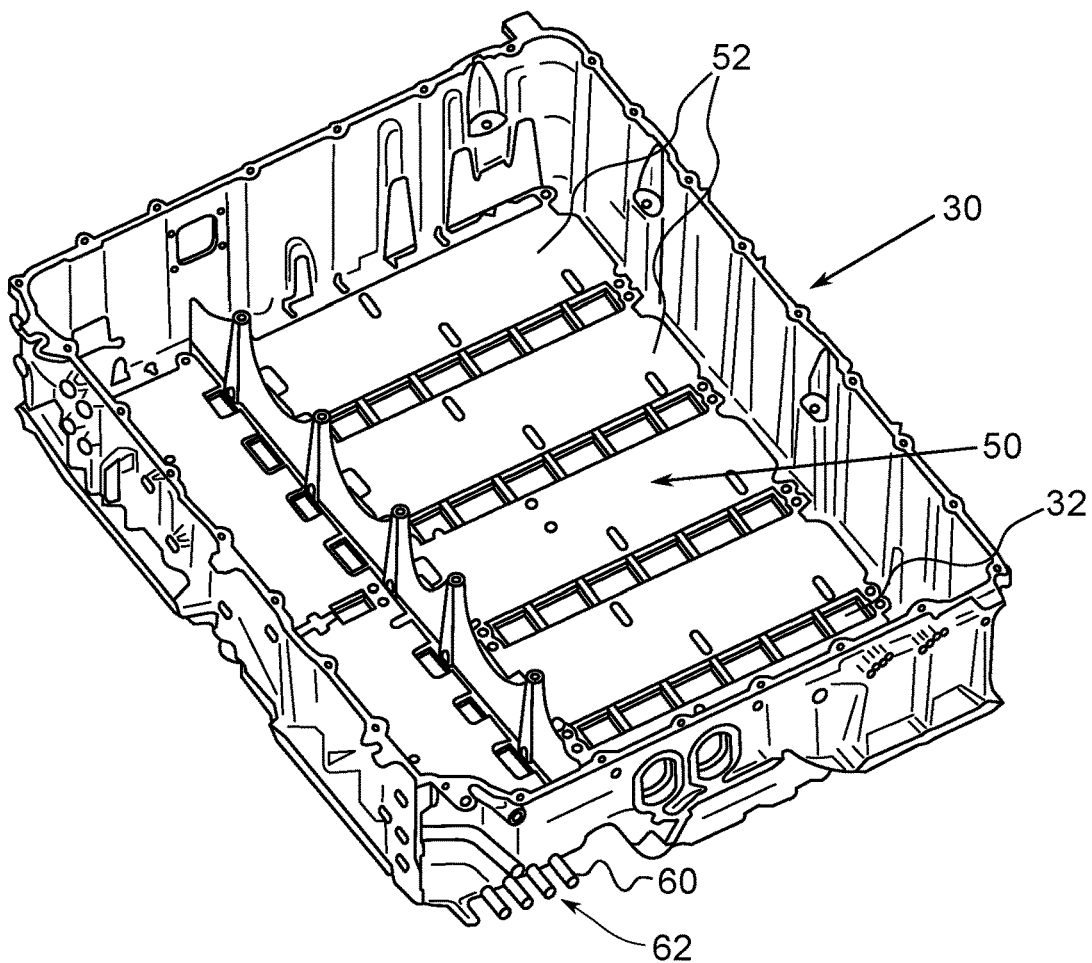
FIG. 2 illustrates a view on a first embodiment of the present invention of a housing for a battery module including a cooling plate.

FIG. 2 illustrates a view on a first embodiment of a housing 30 for a battery module 100 including a cooling plate 50 on which the battery cells 10 are configured to be received or accommodated. In particular, the cooling plate 50 includes a number of cooling areas 52. The cooling plate 50 is on a housing floor 32 and cooling interfaces 60, 62 are placed at the outer surface of the housing 30. The cooling plate is formed of casted aluminum.

The cooling plate 50 may be manufactured in that preformed cooling tubes 70, 72 formed of steel are arranged in a suitable casting die. Afterwards, molten aluminum is casted into the die and hardened. This method ensures an exact positioning of the cooling tubes 70, 72 while pouring the liquid (or molten) aluminum into the die.

Hence, in the manufacturing process, the preformed cooling tubes 70, 72 are placed in a suitable casting die. The cooling tubes 70, 72 thus already exhibit the same design (or shape) that they will have also in the final cooling plate 50. These cooling tubes 70, 72 are embedded into aluminum by chilled casting. After cooling and hardening of the aluminum, the cooling plate 50 is taken out of the die and may be connected to the housing 30.

Figure 3:
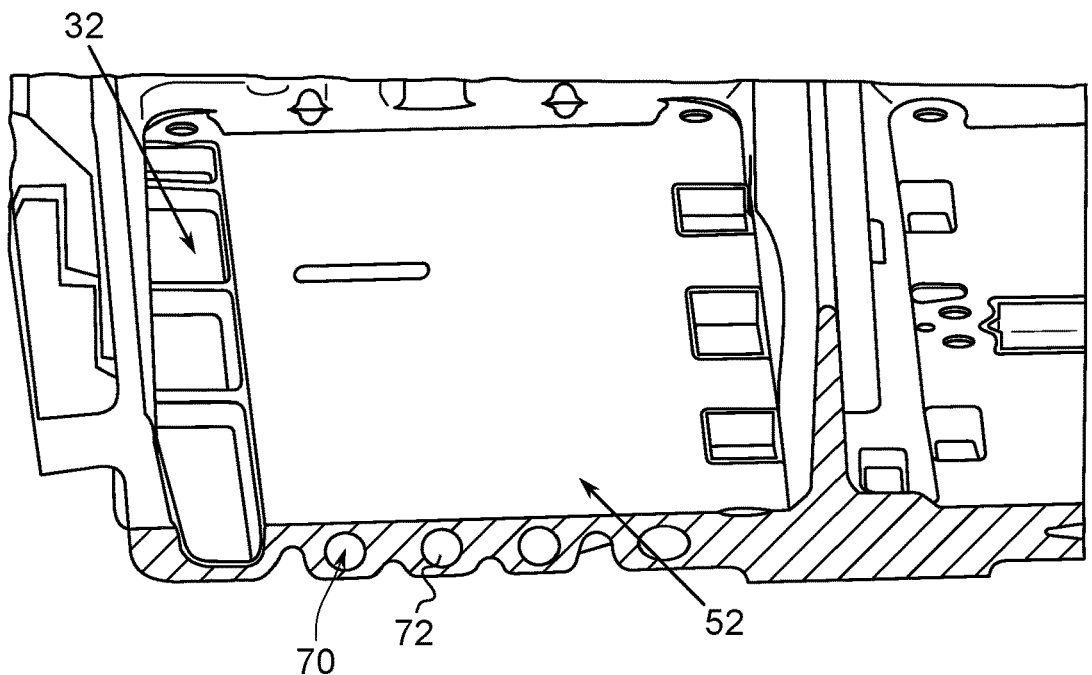
FIG. 3 illustrates a cross-sectional view through a part of the cooling plate of FIG. 2.

FIG. 3 illustrates a cross-sectional view through a part of the cooling plate 50, namely one of the cooling areas 52 of FIG. 2. Cooling tubes 70, 72 are embedded within (or molded inside) the aluminum matrix of the cooling plate 50. The cooling tubes 70, 72 are formed of steel. As can be seen, the cooling tubes 70, 52 are tightly fitted within the cooling plate 50 and there is no need for further fixing components, e.g., there is a firmly bonded joint between the cooling tubes 70, 72 and the cooling plate 50. In such configuration, there is good thermal contact between the cooling plate 50 and the cooling tubes 70, 72.

Figure 4:
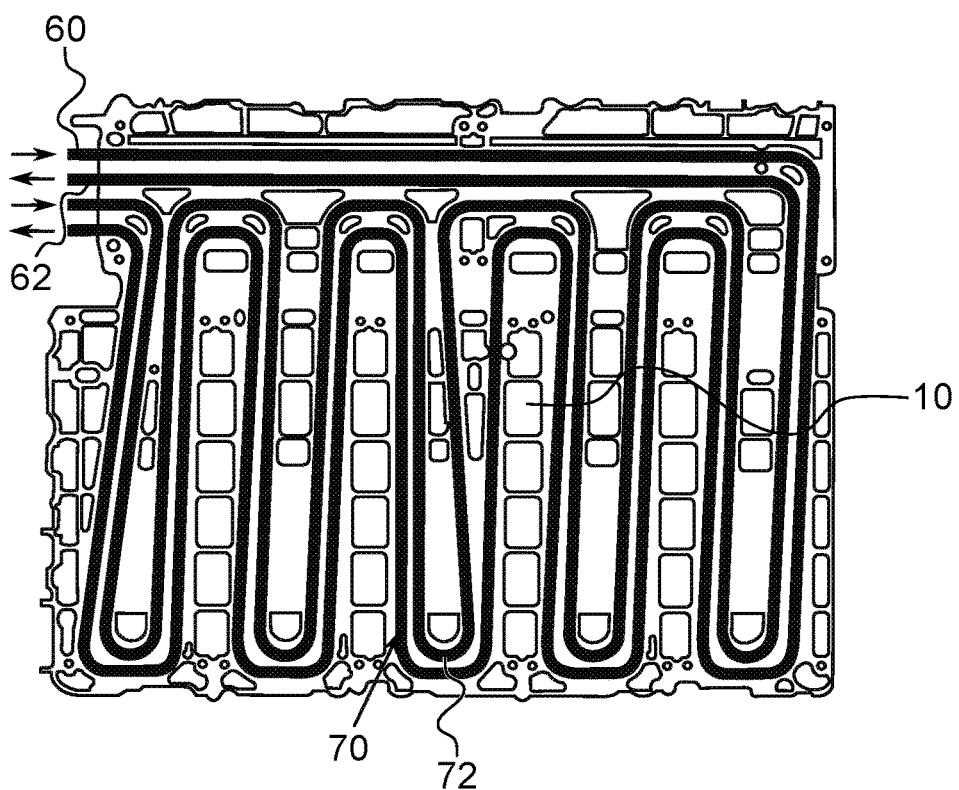
FIG. 4 illustrates the tube winding of the cooling plate of FIG. 2 according to one embodiment of the present invention.

FIG. 4 illustrates the tube winding of the cooling tubes 70, 72 being integrated into the cooling plate 70, 72 of FIG. 2 according to one embodiment of the present invention. In the embodiment shown, the two cooling tubes 70, 72 include five parallel loops, each loop corresponding with one of the cooling areas 52. Supply and return lines are connected to the cooling interfaces 60, 62 such that opposed flow of the coolant occurs to ensure homogenous cooling (e.g., the coolant flows in opposite directions through cooling tubes 70 and 72). At least one of these cooling tubes may be connected with a supply line for the coolant and at least one of the cooling tubes may be connected with a return line for the coolant. Such an arrangement of the coolant channels ensures sufficient and uniform (or substantially uniform) cooling of each battery cell. A dimension and geometry of the cooling areas 52 may be chosen such that underneath a bottom surface of one battery cell 10, which is placed on the cooling plate 50, at least four tubes could be located. The particular design of the cooling tubes 70, 72 may depend on the manufacturing process and the demands of the battery module 100. The cooling tubes are connected to coolant distributor lines, wherein the cooling interfaces are positioned remotely from the battery cells or other parts which may transport electricity. Multiple cooling tubes 70, 72 may be implemented to reduce the pressure loss. For a more specific cooling of the battery module 100, certain areas of the casted cooling plate 50 can be heightened in order to improve the thermal conductivity.

Figure 5:
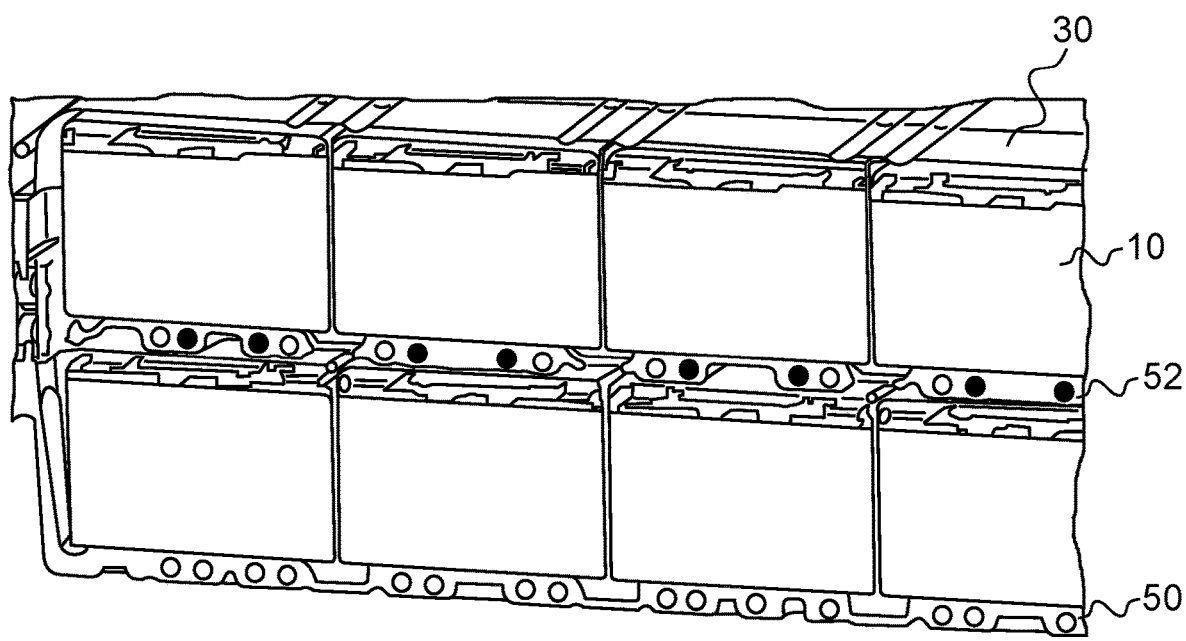
FIG. 5 illustrates a sectional view of a second embodiment of the present invention of a housing for a battery module including two levels of battery cells.

FIG. 5 illustrates a cross-sectional view of a second embodiment of the present invention of a housing 30 for a battery module including two levels of battery cells 10. Each level includes a cooling plate 50, 52. In other words, the upper battery cells 10 are placed on an intermediate cooling plate 52, which may be manufactured in the same way as described above and may have a similar design with respect to the cooling plate 50 provided at the housing floor 32. In other words, the battery module may include multiple cooling plates if the secondary batteries are assembled in different levels of the battery module. The cooling plates will then be provided between these levels to ensure thermal contact with each of the secondary battery cells.

Figure 6:
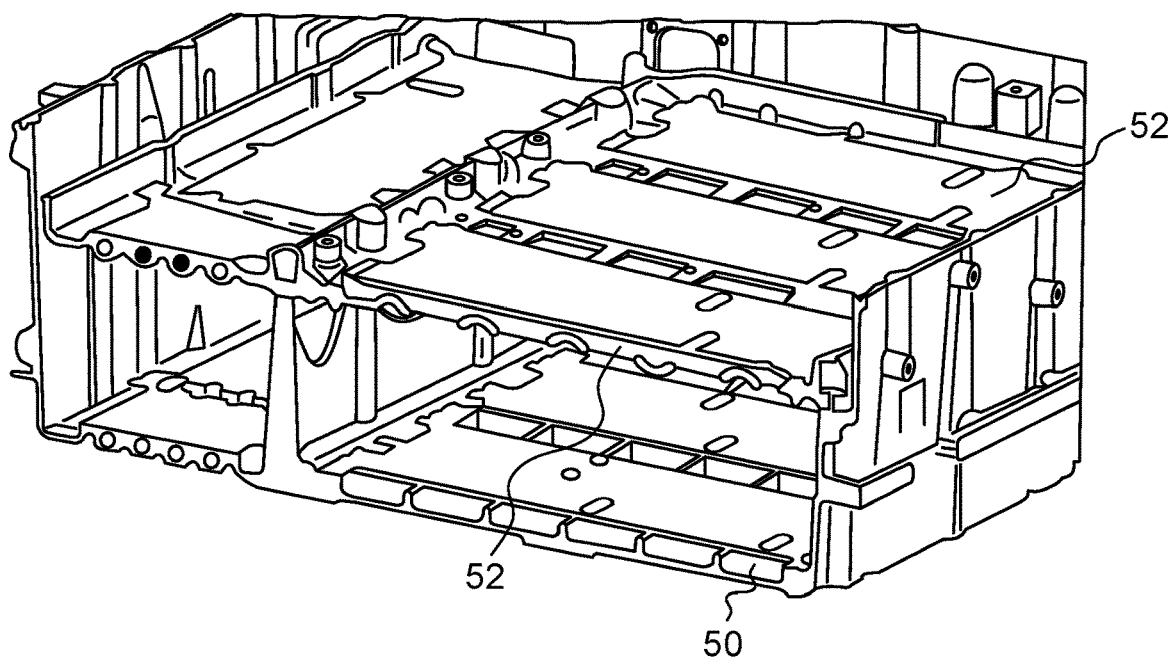
FIG. 6 illustrates the two levels of cooling plates of FIG. 5.

FIG. 6 illustrates the two levels of cooling plates 50, 52 of FIG. 5 without the battery cells 10. As can be seen, the cooling plates 50 and 52 show the very same design of cooling areas 52.

Figure 7:
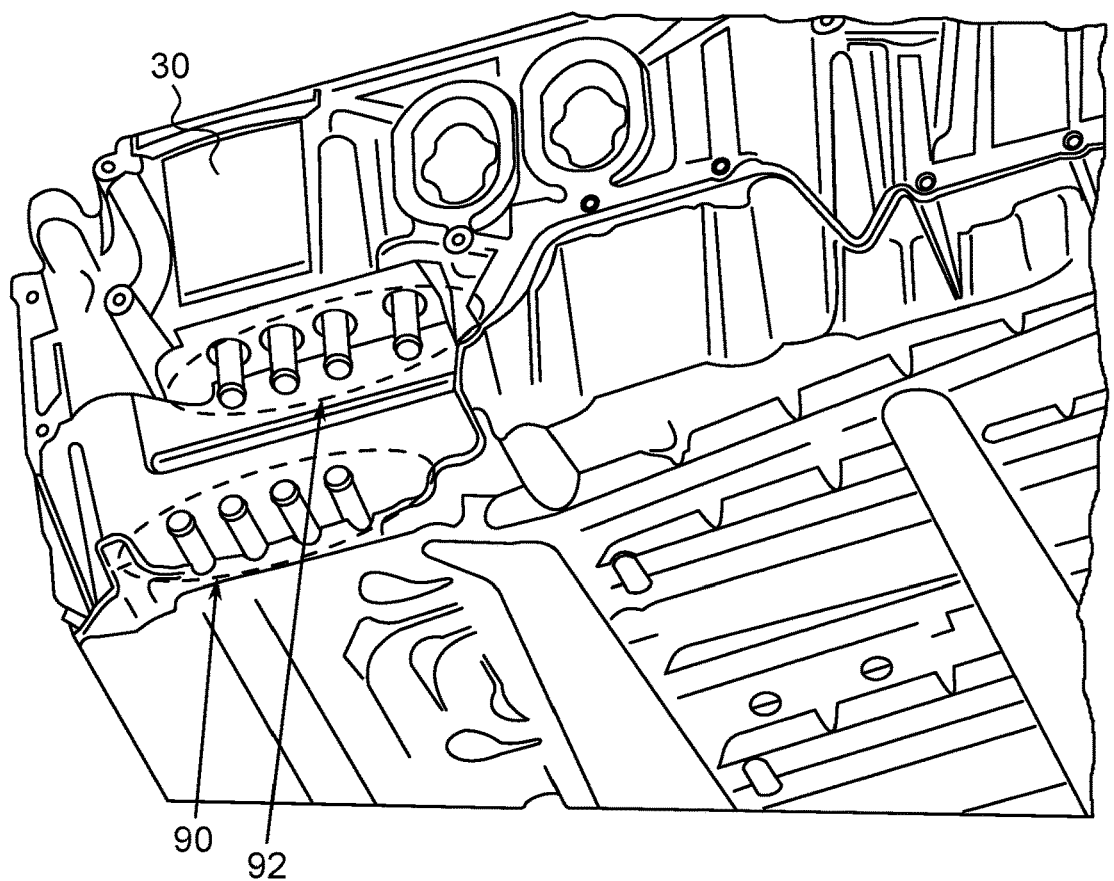
FIG. 7 illustrates the cooling interfaces for both levels of cooling plates of FIG. 5.

FIG. 7 illustrates the cooling interfaces 90, 92 for both levels of cooling plates 50, 52 of FIG. 5. Again, the cooling interfaces 90, 92 are arranged at an outer surface of the housing 30.

In other words, the battery module includes a rigid cooling plate made of casted aluminum, which involves integrated tubes made of a metal material (e.g. iron, aluminum or magnesium, preferably steel) through which a coolant flows. The (for example prismatic or rectangular) secondary battery cells may be arranged on top of the cooling plate such that they are thermally connected to the cooling plate. The thermal contact may be enforced by an adhesive joint or a thermal pad. The cooling tubes are molded within the cooling plate, i.e. they are embedded into the aluminum matrix. Hence, the cooling tubes cannot be removed/are not separable without destroying the cooling plate. There are no additional fixing means for connecting the cooling tubes with the cooling plate, which simplifies the manufacturing process (less assembly effort) and reduces the manufacturing costs and total weight significantly. Moreover, the mechanical rigidity of the cooling plate is improved. Further, even if the aluminum cooling plate breaks due to mechanical stress (e.g. impact) the cooling tubes remain intact. In addition, the outstanding thermal conductivity of aluminum and metal material, especially steel ensures that the temperature distribution within the cooling plate is evenly.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery module comprising:
   a plurality of secondary battery cells;
   a plurality of cooling tubes formed of a metal material, the cooling tubes being configured for a coolant to pass therethrough and being formed in a plurality of loops, the loops being respectively arranged at least partially under the secondary battery cells; and
   a cooling plate formed of casted aluminum, the cooling plate being cast around the cooling tubes, the cooling tubes being molded within the cooling plate,
   wherein a first one of the cooling tubes is configured for coolant to pass therethrough in a first direction and a second one of the cooling tubes is configured for coolant to pass therethrough in a second direction different from the first direction,
   wherein the cooling tubes each have an inlet end and an outlet end on a first side of the cooling plate, and
   wherein the cooling tubes each comprise a straight portion extending from the first side of the cooling plate toward an opposite side of the cooling plate past all of the loops, the straight portions being outside a periphery of the secondary battery cells.

2. The battery module of claim 1, wherein the cooling plate is within a housing of the battery module.

3. The battery module of claim 2, wherein the secondary battery cells are arranged in two or more levels within the housing, each level including at least one cooling plate.

4. The battery module of claim 2, wherein a plurality of cooling interfaces connect the cooling tubes to one of supply lines or return lines, and
   wherein the cooling interfaces are at an outer surface of the housing.

5. The battery module of claim 1, wherein two or more of the secondary battery cells are bundled in a row, and the first and second ones of the cooling tubes are positioned underneath the row such that each secondary battery cell is in thermal contact with the first and second ones of the cooling tubes.

6. The battery module of claim 1, wherein the metal material of the cooling tubes is steel.

7. A vehicle including a battery module according to claim 1.

8. The battery module of claim 1, wherein the cooling tubes have a substantially constant diameter along their entire lengths in the cooling plate.

9. A battery module comprising:
   a plurality of secondary battery cells; and
   a cooling plate formed of casted aluminum, the cooling plate comprising a plurality of cooling tubes formed of a metal material, the cooling plate being cast around the cooling tubes, the cooling tubes being molded within the cooling plate, configured for a coolant to pass therethrough, and formed in a plurality of loops,
   wherein a first one of the cooling tubes is configured for coolant to pass therethrough in a first direction, and a second one of the cooling tubes is configured for coolant to pass therethrough in a second direction different from the first direction,
   wherein one of the loops of each of the first one and the second one of the cooling tubes is arranged below one of the secondary battery cells such that four portions of the cooling tubes are arranged below the one of the secondary battery cells, and
   wherein at least one of the secondary battery cell is arranged over only straight portions of the first one and the second one of the cooling tubes.

10. The battery module of claim 9, wherein the cooling plate is within a housing of the battery module.

11. The battery module of claim 10, wherein the secondary battery cells are arranged in two or more levels within the housing, each level including at least one cooling plate.

12. The battery module of claim 10, wherein a plurality of cooling interfaces connect the cooling tubes to one of supply lines or return lines, and
   wherein the cooling interfaces are at an outer surface of the housing.

13. The battery module of claim 9, wherein two or more of the secondary battery cells are bundled in a row, and the first and second ones of the cooling tubes are positioned underneath the row such that each secondary battery cell is in thermal contact with the first and second ones of the cooling tubes.

14. The battery module of claim 9, wherein the metal material of the cooling tubes is steel.

15. A method of manufacturing a battery module, the battery module comprising a plurality of secondary battery cells and a cooling plate, the method comprising:
   forming the cooling plate by:
      providing a plurality of preformed cooling tubes formed of a metal material in a casting die, the cooling tubes having a plurality of bent portions; and casting aluminum into the casting die in order to form a cooling plate, wherein the cooling tubes each have an inlet end and an outlet end on a first side of the cooling plate, and wherein the cooling tubes each comprise a plurality of loops and a straight portion extending from the first side of the cooling plate toward an opposite side of the cooling plate past all of the loops, the loops being respectively arranged at least partially under the secondary battery cells, the straight portions being arranged outside a periphery of the secondary battery cells.

\* \* \* \* \*